United States Patent [19]

Kanehira et al.

[11] Patent Number: 5,202,878
[45] Date of Patent: Apr. 13, 1993

[54] OPTICAL RECORDING AND REPRODUCING METHOD AND APPARATUS FOR THE SAME

[75] Inventors: Jun Kanehira; Naoyuki Ueno, both of Tokyo, Japan

[73] Assignee: Olympus Optical Co., Ltd., Tokyo, Japan

[21] Appl. No.: 703,413

[22] Filed: May 21, 1991

[30] Foreign Application Priority Data

May 24, 1990 [JP] Japan ................................. 2-134944
Apr. 18, 1991 [JP] Japan ................................. 3-86770

[51] Int. Cl.$^5$ ................................................ G11B 7/00
[52] U.S. Cl. ................................ 369/100; 369/109; 369/112; 369/44.26
[58] Field of Search ............... 369/100, 103, 109, 112, 369/124, 44.26; 365/106

[56] References Cited

U.S. PATENT DOCUMENTS 3,971,002  7/1976  Bricot et al. ..................... 369/109
5,056,080  10/1991  Russell ............................. 369/100

FOREIGN PATENT DOCUMENTS 61-129748  6/1986  Japan .

Primary Examiner—Constantine Hannaher
Assistant Examiner—Kiet T. Nguyen
Attorney, Agent, or Firm—Frishauf, Holtz, Goodman & Woodward

[57] ABSTRACT

According to the present invention, recording laser beam is shot from a semiconductor laser to form a mark set which comprises a pair of marks on the track of an optical recording medium in the track width direction thereof and first information which has been coded corresponding to the interval between the paired marks in the mark set is recorded on the track of the optical recording medium. At the same time, the plural mark sets are formed on the track of the optical recording medium in the track length direction thereof and second information which has been coded corresponding to the interval between these mark sets is recorded on the track of the optical recording medium. The track of the optical recording medium is scanned in the track width direction thereof with reproducing laser beam shot from a semiconductor laser and ± first-order diffraction beam of an optical interference pattern which is created from the paired marks in the mark set thus scanned is detected to reproduce the first information. At the same time, the track is scanned in the track length direction thereof with the reproducing laser beam and zero-order diffraction beam of an optical interference pattern which changes corresponding to the interval between the plural mark sets thus scanned is detected to reproduce the second information.

18 Claims, 9 Drawing Sheets

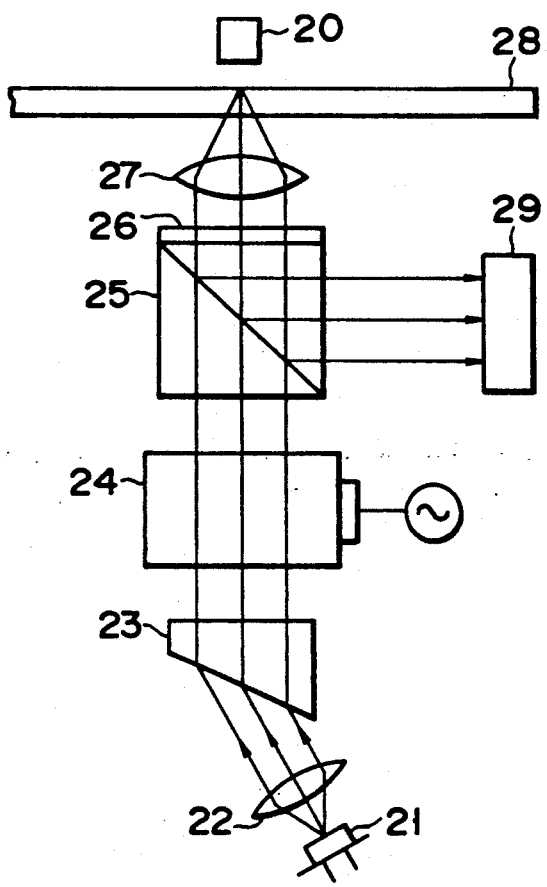
F I G. 11
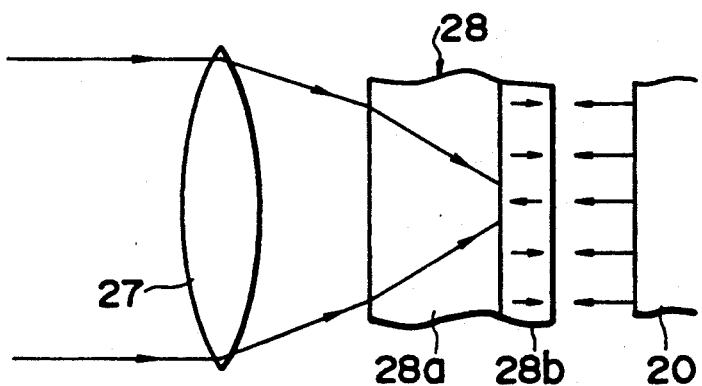
F I G. 12

OPTICAL RECORDING AND REPRODUCING METHOD AND APPARATUS FOR THE SAME

BACKGROUND OF THE INVENTION

1. Field of the Invention

The present invention relates to an optical recording and reproducing method and a apparatus for the same and, more particularly, it relates to a multi-value information recording and reproducing method and an apparatus for the same intended to increase its recording density.

2. Description of the Related Art

CDs and laser disks of the read-only type (ROM), Te-metal thin films and organic pigment films of the write-only type (WORM), and magnetooptic films and Calkogenite phase change films of the reversible type (E-DRAW) are used as the conventional recording media employed by this kind of the method and apparatus. In a case where a certain information is to be recorded on one of these recording media, recording laser beam converged to a wavelength is shot onto the recording medium and run thereon in the track length direction thereof to form plural marks thereon at a certain interval. Information which has been coded corresponding to the interval between these marks is recorded on the recording medium. In a case where the certain information is to be reproduced from the recording medium, the recording medium is scanned in the track length direction thereof to detect diffraction beam which changes depending upon whether or not the marks are present on the track of the recording medium.

The following various methods have been proposed these days to increase the recording density: Methods of changing the reflection factor of each of the marks step by step. of changing the depth of the mark, of changing the size of the mark, changing the interval between the marks, and of making small the interval between the tracks. In addition, there is a method of recording information on each of plural layer films which form the recording medium to increase the recording density. These methods mentioned above are intended to straight increase pieces of information recorded by changing a mark step by step.

Japanese Patent Disclosure Sho 61-129748 discloses a further method, whereby a set of information is converted to a pattern (or optical interference or diffraction pattern) at a certain area different in surface contour and recorded on the recording medium and whereby the optical interference or diffraction pattern created by the converted pattern is obtained as the set of information at the time of reproduction.

In the case of these multi-value information recording methods, however, it is difficult to adjust the state of mark recording step by step to accurately detect signals applied from the marks and the extent to which information can be multi-valued is limited to 2 to 4 values. Further, the method of recording a set of information at a certain area as a pattern is used by the simple systems which carry out neither tracking nor focusing, but the recording density achieved by the method is low. Therefore, this method cannot be applied to those systems which are intended to achieve high recording density. Further, it is supposed that the recording medium is made large in size to make pieces of information recorded more in value, but when pieces of information are made more and more in value, the whole of the system must be made large in size.

SUMMARY OF THE INVENTION

The present invention is intended to eliminate the above-mentioned drawbacks and the object of the present invention is therefore to provide an optical recording and reproducing method and an apparatus for the same, capable of stably recording multi-value information on a recording medium by a more compact and simpler means and reproducing the multi-value information from the recording medium by detecting any change in the optical interference pattern in the track width and length directions of the recording medium.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 11 schematically shows the whole of a recording optical system employed by the optical recording and reproducing method and the apparatus for the same according to a second embodiment of the present invention;

FIG. 12 shows information recorded on the vertically-polarized film of an optical magnetic disk by the recording optical system shown in FIG. 11, in which an objective, the optical magnetic disk and a magnetic head are shown enlarged;

DETAILED DESCRIPTION OF THE PREFERRED EMBODIMENTS

The optical recording and reproducing method and the apparatus for the same according to a first embodiment of the present invention will be described referring to FIGS. 1 through 3 and FIG. 7.

Figure 1:
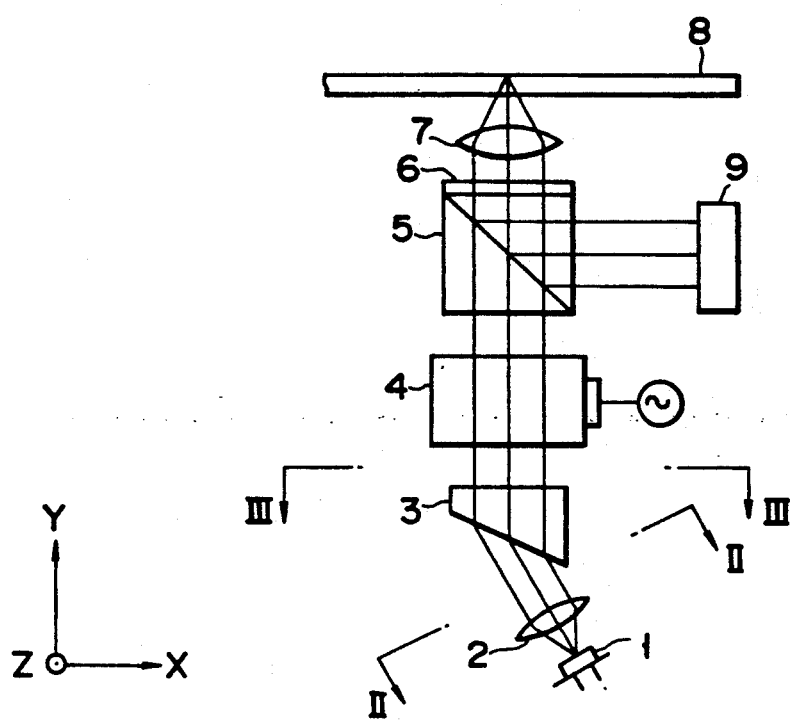
FIG. 1 schematically shows the whole of a recording optical system employed by the optical recording and reproducing method and the apparatus for the same according to a first embodiment of the present invention.
Figure 2:
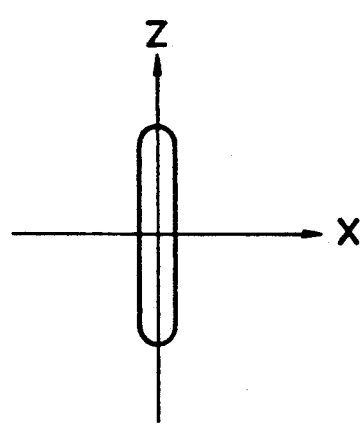
FIG. 2 is a sectional view taken along a line II—II in FIG. 1 and showing a recording laser beam before it is shot to a shaping prism of the recording optical system shown in FIG. 1.
Figure 3:
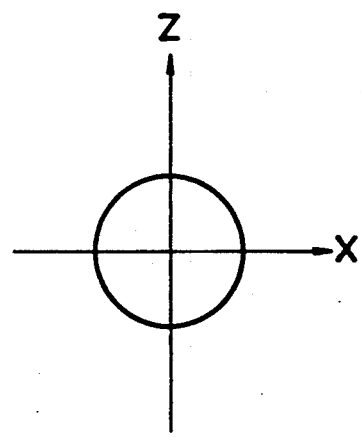
FIG. 3 is a sectional view taken along a line III—III in FIG. 1 and showing the recording laser beam come out of the shaping prism of the recording optical system shown in FIG. 1.
Figure 7:
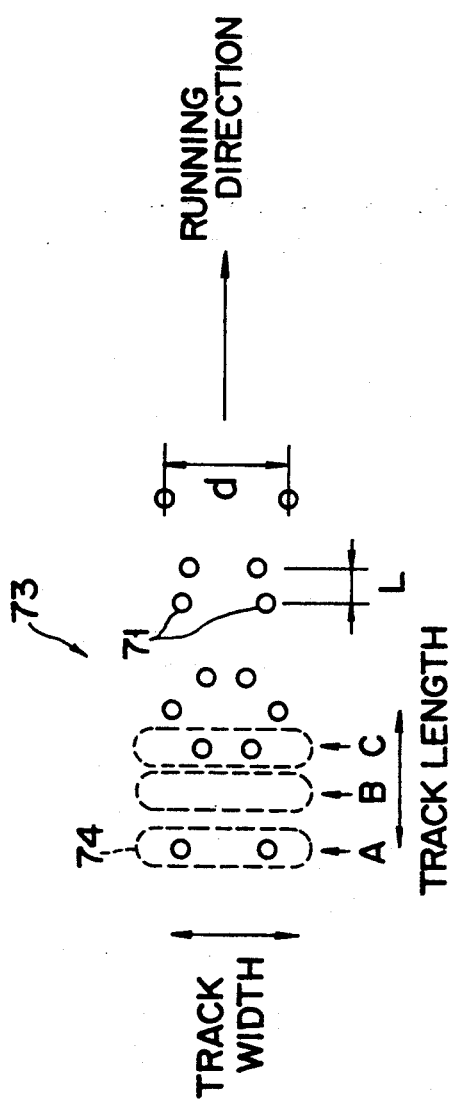
FIG. 7 schematically shows the reproducing laser beam focused on a pair of marks formed on the recording medium employed by the optical recording and reproducing method and the apparatus for the same according to the first embodiment of the present invention.

As shown in FIG. 1, recording laser beam shot from a laser diode 1 is converted to a parallel flux through a collimator lens 2. The section of the recording laser beam which has been converted to the parallel flux is elliptic as shown by a sectional view in FIG. 2 which is taken along a line II—II in FIG. 1. This recording laser beam is shot to an acoustic optic deflector 4 through a aramorphic prism 3, which shapes the recording laser beam to have a circular section as shown by a sectional view in FIG. 3 which is taken along a line III—III in FIG. 1. The acoustic optic deflector 4 diffracts the recording laser beam into diffracted and not-diffracted beams and emits them to a polarization beam splitter 5. The polarization beam splitter 5 allows a component (or component P) of the recording laser beam which vibrates in a direction parallel to the incident face of the splitter 5 to pass through it but reflects another component (or component S) thereof which vibrates in a direction vertical to its incident face. Only the component P of the recording laser beam which has reached the incident face of the splitter 5 is therefore passed through it and shot on a quarter-wave plate 6. The recording laser beam which has been shot on the quarter-wave plate 6 is converted from linear to circular polarization and focused on the track (not shown) of a recording medium 8 through an objective 7. The recording laser beam has been diffracted into two directions (or in the width direction of the track). Therefore, the recording laser beam is focused on the track of the recording medium 8 as two beam spots which have a predetermined interval between them. When the track of the recording medium 8 is shot by these two beam spots, those portions of the track which are shot by the two beam spots are thermally deformed to form pits 71, as shown in FIG. 7. In the case of this embodiment, the two beam spots are shot on the track of the recording medium 8 side by side in the width direction of the track, so that a pair of the pits 71 can be formed on the track side by side in the width direction of the track. When the frequency of ultrasonic wave propagated to the acoustic optic deflector 4 is changed, the interval between the two beam spots shot on the track can be changed (see A and C in FIG. 7). As the result, first information which has been coded responsive to the changing interval between these pits 71 is recorded on the track of the recording medium in the width direction thereof. In the case of this embodiment, the depth of the pit 71 is limited to a quarter of the wavelength of the recording laser beam.

According to the optical recording and reproducing method and the apparatus for the same, second information (which is different from the first one) is also recorded on the track of the recording medium in the length direction of the track. This is carried out in such a way that mark sets 73 (see FIG. 7) each of which comprises a set of the above-mentioned paired pits 71 are formed on the track of the recording medium at a certain interval along the length direction of the track. As the result, the second information which has been coded responsive to the changing interval between the mark sets 73 is recorded on the track of the recording medium in the length direction thereof.

According to the optical recording and reproducing method and the apparatus for the same, the first information is recorded on the track of the recording medium 8 in the width direction thereof while recording the second information (different from the first one) thereon in the length direction thereof. This enables the recording density of the recording medium 8 to be enhanced to a greater extent.

While these informations are being recorded on the recording medium 8, the recording laser beam reflected by the recording medium 8 is passed through the quarter-wave plate 6 via the objective 7. The polarized face of the recording laser beam which has been passed through the quarter-wave plate 6 is converted to linear polarization which is swung from its first linear polarization by 90°. The recording laser beam is therefore reflected by the polarization beam splitter 5 and lead to a focus tracking servo-detector 9. This focus tracking servo-detector 9 detects any change in the light quantity of the recording laser beam shot to it to control the position of the objective 7 so as to focus the optimum beam spots on the track of the recording medium. This can prevent the pits 71 from being wrongly formed on the track of the recording medium because of the face vibration and eccentricity of the medium 8.

A reproducing optical system employed by the optical recording and reproducing method and the apparatus for the same according to the present invention will be described referring to FIGS. 4 through 7. Same components as those in the above-described recording optical system will be denoted by same reference numerals and description on these components will be omitted.

Figure 4:
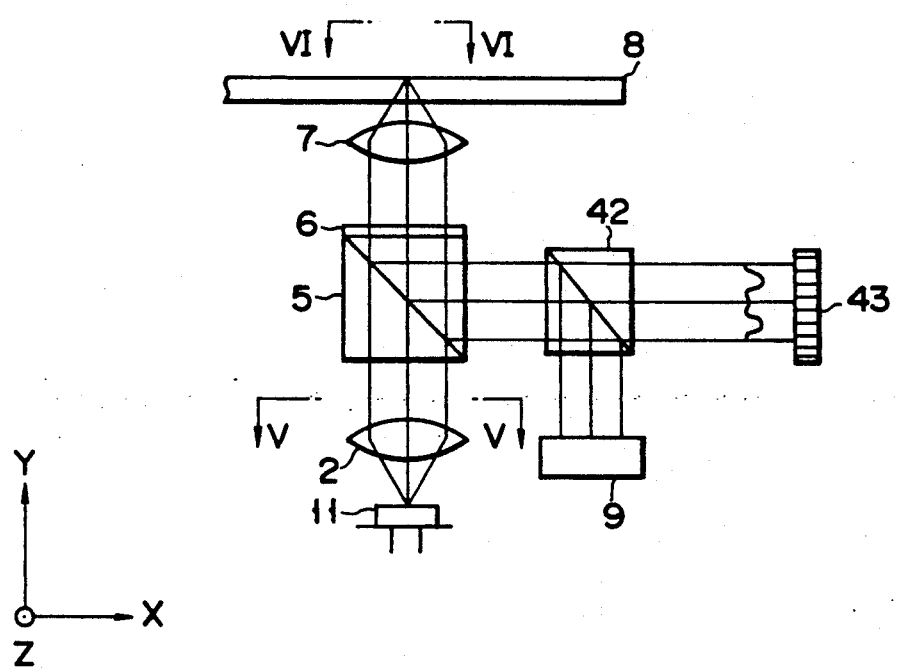
FIG. 4 schematically shows the whole of a reproducing optical system employed by the optical recording and reproducing method and the apparatus for the same according to the first embodiment of the present invention.
Figure 5:
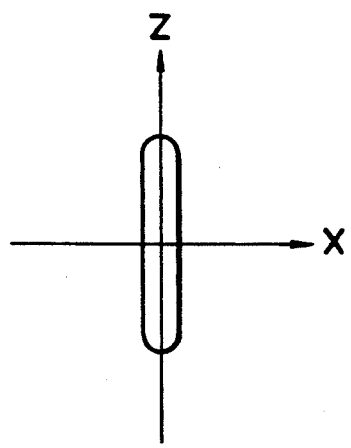
FIG. 5 is a sectional view taken along a line V—V in FIG. 4 and showing a reproducing laser beam before it is shot to a polarization beam splitter of the reproducing optical system shown in FIG. 4.
Figure 6:
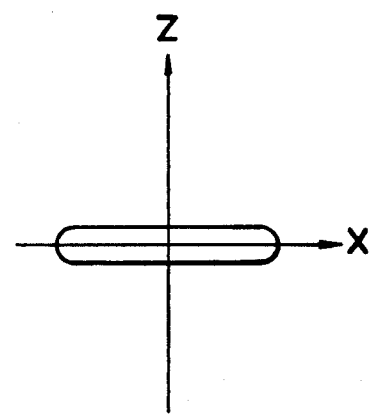
FIG. 6 is a sectional view taken along a line VI—VI in FIG. 4 and showing the reproducing laser beam focused on a recording medium through the reproducing optical system shown in FIG. 4.

As shown in FIG. 4, reproducing laser beam (which has a laser power smaller than that of recording laser beam) shot from a laser diode 11 is converted to a parallel flux while passing through the collimator 2. The reproducing laser beam which has been converted to the parallel flux has an elliptic section, as shown by sectional view in FIG. 5 which is taken along a line V—V in FIG. 4. The reproducing laser beam which has this section is focused on the track (not shown) of the recording medium 8 through the polarization beam splitter 5, the quarter-wave plate 6 and the objective 7. The beam spot of the reproducing laser beam focused on the recording medium 8 has an elliptic section or illuminating section long in the width direction of the track of the recording medium 8 but short in the length direction thereof, as shown by a sectional view in FIG. 6 which is taken along a line VI—VI in FIG. 4.

In the case of this embodiment, the reproducing laser beam shot to the recording medium 8 is elliptic in section because the beam shot from the laser diode 1 is used as it is.

As shown in FIG. 7, the paired pits 71 formed through the above-described recording optical system are positioned on the track of the recording medium 8 side by side in the width direction thereof. If the reproducing laser beam is shot on the track of the recording medium 8 in the form of circular beam spots, these beam spots overlap the pits 71 in the other mark set 73 adjacent to the beam-spots-shooting are of the track in the length direction thereof. As the result, beam diffracted from the overlapped portion causes noises to thereby make it impossible to accurately read recorded information at the time of reproduction. In order to solve this problem, the reproducing laser beam shot through the reproducing optical system of the present invention has a shooting area 74 longer than the maximum value of the interval (d) between the paired pits 71 in the mark set 73 in the width direction of the track of the recording medium 8 moreover shorter than the minimum value of the interval (L) between the mark sets 73 in the length direction thereof.

The shooting area 74 can also be defined by incorporating polarization means such as slits and polarizing plates into the reproducing optical system.

As shown in FIG. 7 (or by A. B and C in FIG. 7), the recording medium 8 is successively scanned in the length direction of the track thereof by the reproducing laser beam. When scanning is carried out in this manner, diffraction beam reflected by the track of the recording medium 8 is caused. This reflected diffraction beam is again converted to the parallel flux whil passing through the objective 7 and it is lead to the polarization beam splitter 5 through the quarter-wave plate 6. The polarization face of the reflected diffraction beam which has passed through the quarter-wave plate 6 is converted to linear polarization which is swung from its first linear polarization by 90°. The reflected diffraction beam is thus reflected by the polarization beam splitter 5 and shot to a beam splitter 42. The beam splitter 42 shoots the reflected diffraction beam to the focus tracking servo-detector 9 and to a signal detecting linear sensor 43. The focus tracking servo-detector 9 detects any change in the light quantity of the reflected diffraction beam to control the position of the objective 7 so as to enable optimum beam spots to be focused on the track of the recording medium 8. This can prevent the pits from being wrongly reproduced because of the face vibration and eccentricity of the recording medium 8. As will be described later, the signal detecting linear sensor 43 detects the optical interference pattern of the reflected diffraction beam to reproduce the first and second informations.

Figure 9:
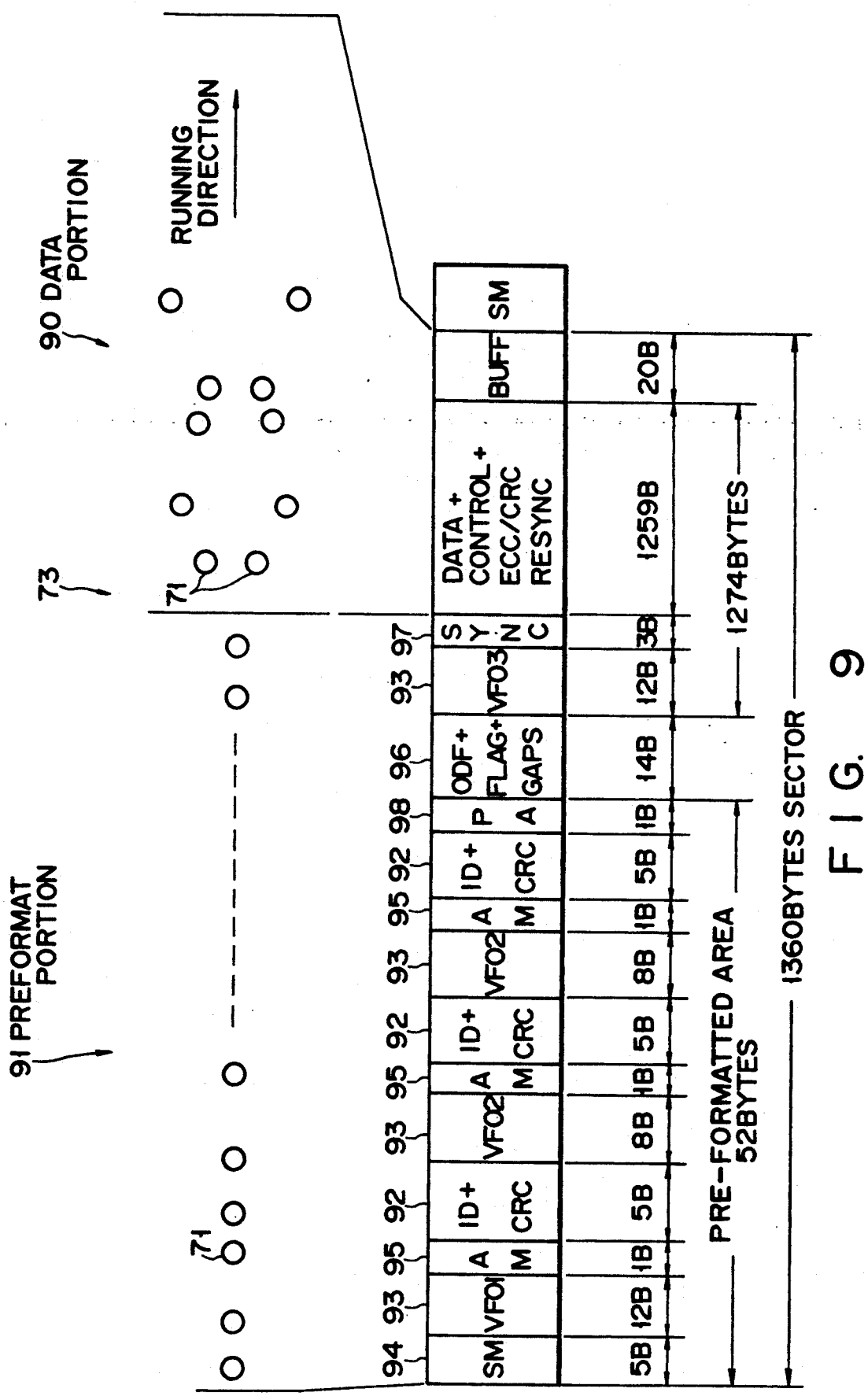
FIG. 9 schematically shows a sector format of the recording medium employed by the optical recording and reproducing method and the apparatus for the same according to the present invention.

These information recording and reproducing are carried out every certain amount of information which is called a sector. FIG. 9 shows an example of the sector format of the continuous servo type (ISO) which is employed by the embodiment of the present invention.

This sector has a capacity of 1360 bytes and it is provided with preformat and data portions 91 and 90.

The preformat portion 91 must have high reliability. Therefore, information is recorded there in the following regions at such pit positions as modulated from 2 to 7 not in the track width direction but only in the track length direction.

Track and sector numbers of the preformat portion 91 are recorded at an ID region 92. Information is recorded in triple at this ID region 92 in addition to an error detecting CRC (or cyclic redundancy code). A PLL (or phase-locked loop) lead-in $VFO_1$, $VFO_2$ or $VFO_2$ region 93 is provided before each of the ID regions 92. An AM (or address mark) region 95 is provided between the $VFO_1$, $VFO_2$ or $VFO_2$ region 93 and the ID region 92. When the AM region 95 is located in this manner, it can be detected as an irregular pattern which does not follow the modulation system to detect ID from AM even if SM (or sector mark) is not present. An ODF region 96 has no guide groove but a capacity of 1 byte and it is used to detect the amount of tracking offset. Further, the ODF region 96 includes an FLAG region (5 bytes), which tells whether or not information is recorded and which serves to prevent informations recorded from being overlapped. A PA region 98 is provided just before the ODF region. $VFO_3$ and synchronous pattern (SYNC) regions 93 and 97 are provided at the rear side area of the preformat portion 91.

The data portion 90 has a capacity of 1259 bytes and various kinds of information are recorded there. More specifically, information of 4 bits coded corresponding to the interval between the paired pits 71 is recorded at the data portion 91 in the track width direction. Information of 8 bits coded corresponding to the interval between the mark sets 73 is recorded at the data portion 90 in the track length direction. An error correcting code (ECC, CRC), a re-synchronous pattern (RESYN), an FAT (file allocation table) which shows the sectors continuous, and the like are recorded at the data portion 90, while being modulated from 2 to 7.

A more concrete method of recording and reproducing first and second informations on and out of the data portion 90 through the above-described recording and reproducing optical systems will be described.

The information recording method is carried out in such a way that the preformat portion 91 is scanned by the reproducing optical system to confirm the data portion 90. The following informations are then recorded at the data portion 90 through the recording optical system. Namely, the first information coded corresponding to the interval between the paired pits 71 is recorded at the data portion 90 in the track width direction. Further, the second information coded corresponding to the interval between the mark sets 73 each of which comprises a set of the paired pits 71 is recorded at the data portion 90 in the track length direction.

The information reproducing method is carried out using the above-described reproducing optical system. When the track of the recording medium is scanned in the width direction thereof by the reproducing optical system, reflected diffraction beams are created from the paired pits 71 and they interfere with each other. As the result, an interference pattern (see FIGS. 8A through 8C) which corresponds to the interval between the paired pits 71 is caused and detected by the signal detecting linear sensor 43.

Figures 8A, 8B, 8C:
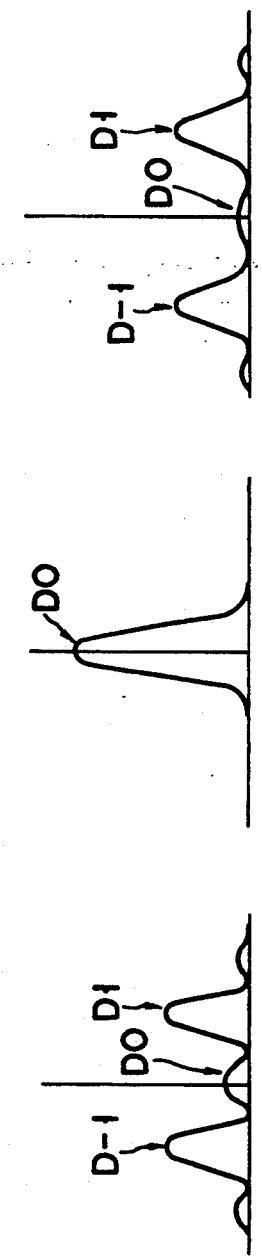
FIGS. 8A through 8C show optical interference patterns created from the paired marks.

The information reproducing method will be described on two cases where it is carried out in the track width direction and in the track length direction In the case where information is to be reproduced in the track width direction, the track of the recording medium is scanned in the width direction thereof by the reproducing laser beam, as shown by a symbol (A) in FIG. 7. As the result, an optical interference pattern which corresponds to the interval between the paired pits 71 is caused (see FIG. 8A). Peak positions D-1 and D1 of ± first-order diffraction beam of this pattern and a peak position D0 of zero-order diffraction beam thereof are detected by the signal detecting linear sensor 43. When the interval between maximum values is measured of the ± first-order diffraction one of those diffraction beams which have been detected, the interval between the paired pits 71 is detected. As the result, the first information which has been coded corresponding to the interval between the paired pits 71 is reproduced. Because no pit is formed at an area shown by a symbol (B), no optical interference pattern but a pattern which comprises only zero-order diffraction beam as shown in FIG. 8B is obtained there. When the reproducing laser beam is shot to an area shown by a symbol (C), the optical interference pattern becomes as shown in FIG. 8C and this is because the interval between the paired pits 71 is different from the one at the area shown by the symbol (A). The first information can also be reproduced by detecting minimum values of the ± first-order diffraction beam or any change in the light intensity of the zero-order diffraction beam by means of the signal detecting linear sensor 43.

In the case where information is to be reproduced in the track length direction, the track of the recording medium is successively scanned in the length direction thereof by the reproducing optical system, as shown by the symbols (A), (B) and (C) in FIG. 7. As the result, interference patterns shown in FIGS. 8A through 8C are successively created. When change in each of these interference patterns is detected, change in each of the intervals between the mark sets 73 can be detected. The second information which has been coded corresponding to the interval between the mark sets 73 is thus reproduced. More specifically, change in the peak position D0 of the zero-order diffraction beam is digital-converted into "0" and "1" to thereby reproduce the second information. The second information can also be reproduced by digital-converting change in the peak positions D-1 and D1 of the ± first-order diffraction beam into "0" and "1".

Figure 10:
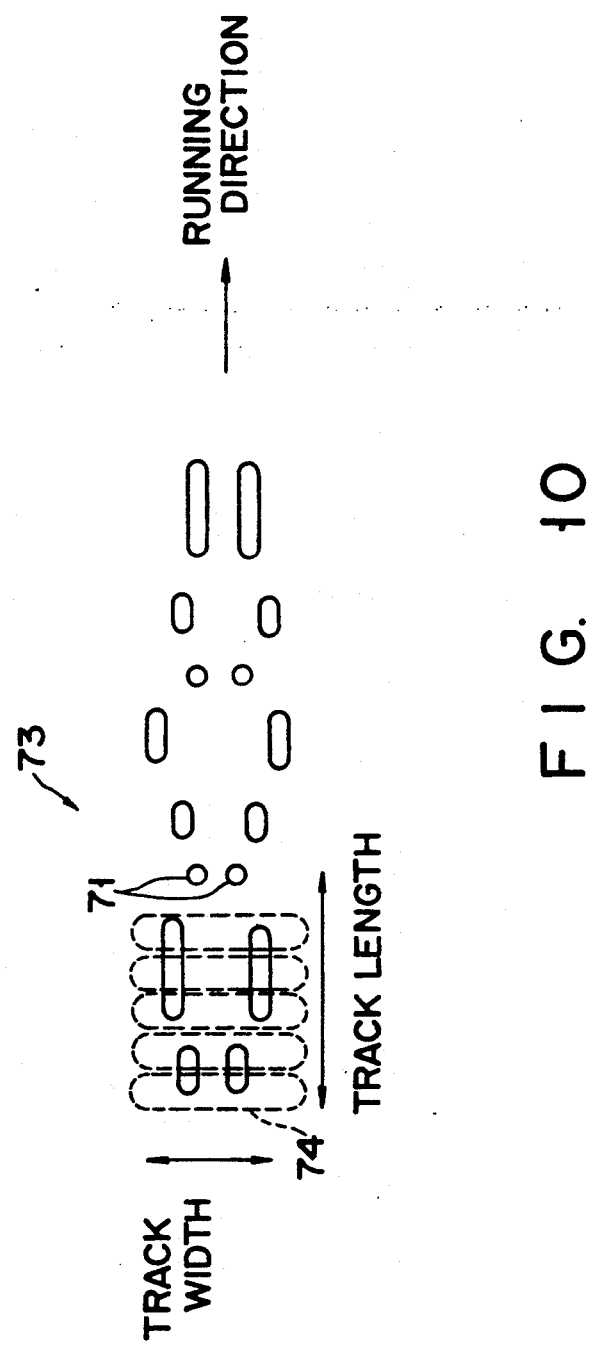
FIG. 10 schematically shows the reproducing laser beam focused on the paired marks formed on another recording medium which is employed by the optical recording and reproducing method and the apparatus for the same according to the present invention.

In FIG. 10, image data (or first information) is recorded on the track of the recording medium in the width direction thereof and voice data (or second information) whose pit length is changed according to the EFM pit length recording manner is recorded on the track of the recording medium in the length direction thereof.

When information is to be reproduced from this recording medium 8, the track of the recording medium 8 is scanned in the length direction thereof by the reproducing laser beam which has the above-mentioned illuminating section or area 74 (see FIG. 7). As described above, an interference pattern which corresponds to the interval between the paired pits 71 is created from the paired pits 71. When the interval between the peak positions D-1 and D1 of the ± first-order diffraction beam is detected of the interference pattern, the image data (or first information) can be reproduced. When the information which has been recorded on the track of the recording medium 8 in the length direction thereof is to be reproduced, changes in the zero-order diffraction beam (or ± first-order diffraction beam) are successively detected of the optical interference pattern which is created depending upon whether or not the mark set 73 is present, and they are EFM-demodulated to reproduce CD voice signal (or second information). The information which is recorded on the track of the recording medium in the length direction thereof is not limited to the CD voice but it may be image data or data whose analog FM is converted about its pit length. The information which is recorded in the track width direction is not limited to image data but it may be others.

The optical recording and reproducing method and the apparatus for the same according to a second embodiment of the present invention will be described referring to FIGS. 11 through 16.

FIG. 11 schematically shows a recording optical system employed by the optical recording and reproducing method and the apparatus for the same according to the second embodiment of the present invention.

As shown in FIG. 11, recording laser beam which has an elliptic section and which is shot from a laser diode 21 is converted into a parallel flux while passing through a collimator lens 22. The recording laser beam which has been converted into the parallel flux is shaped by a anamorphic prism 23 to have a circular section, and then lead to an acoustic optic deflector 21. The acoustic optic deflector 21 diffracts the recording laser beam to not-diffracted and diffracted beams and shoots them to a polarization beam splitter 25. The polarization beam splitter 25 allows their component (or component P) which vibrates in a direction parallel to its incident face to pass through it but reflects their component (or component S) which vibrates in a direction vertical to its incident face. Therefore, only the component P of the recording laser beam which has reached the polarization beam splitter 25 is passed through the splitter 25 and shot to a quarter-wave plate 26. The laser beam which has been shot to the quarter-wave plate 26 is converted from linear to circular polarization and focused on the track (not shown) of an optical magnetic disk 28 through an objective 27. The recording laser beam thus focused is shot onto the optical magnetic disk 28 as two beam spots which have a certain interval between them, because it has been diffracted to two directions by the acoustic optic deflector 24 (see FIG. 14).

Figure 14:
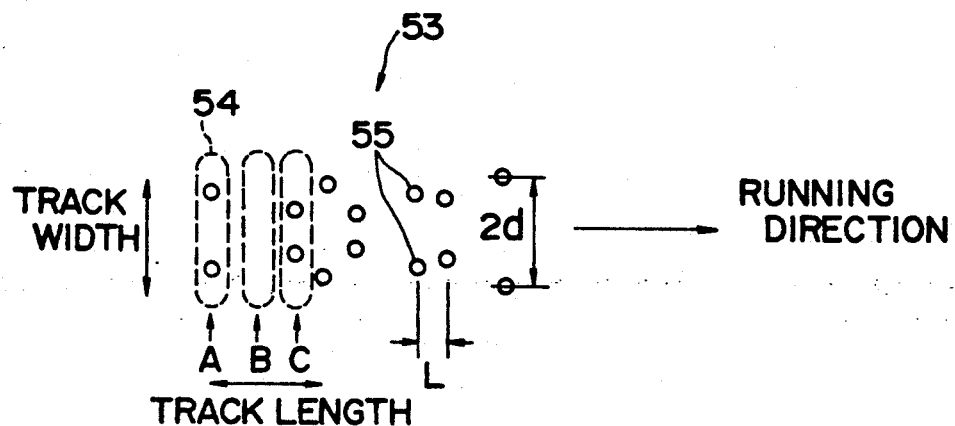
FIG. 14 schematically shows the reproducing laser beam focused on the paired marks formed on the optical magnetic disk which is employed by the optical recording and reproducing method and the apparatus for the same according to the second embodiment of the present invention.

When the frequency of ultrasonic wave propagated to the acoustic optic deflector 24 is changed, the interval between the two beam spots on the optical magnetic disk 28 can be changed as shown by symbols A and C in FIG. 14.

A method of recording predetermined information on the optical magnetic disk 28 by using the recording laser beam focused on the optical magnetic disk 28 will be described.

As shown in FIG. 12, the optical magnetic disk 28 employed by the optical recording and reproducing method and the apparatus for the same according to the second embodiment of the present invention comprises a transparent base plate 28a made of glass or plastics and a vertically-magnetized film 28b formed on the base plate 28a by the RF sputtering manner and made of Bi-substituted magnetic garnet. This vertically-magnetized film 28b direct its magnetization in a same direction under such a condition that no information is recorded thereon. The coercive force of this magnetization becomes small when heat is added to the film 28b. A magnetic head 20 is therefore located on the side of the vertically-magnetized film 28b of the optical magnetic disk 28 to apply external magnetic field to the film 28b in a direction reverse to the magnetized direction of the film 28b, while shooting the recording laser beam onto the film 28b. That portion of the vertically-magnetized film 28b which is irradiated by the recording laser beam causes the coercive force of its magnetization to be decreased and its magnetized direction to be reversed to direct in a same direction as the external magnetic field. When the shooting of the recording laser beam is then stopped, the direction of the magnetization of the film 28b can be kept as it is.

In the case of this embodiment, two beam spots located side by side in the track width direction of the optical magnetic disk 28 are shot onto the vertically-magnetized film 28b of the disk 28 at the same time and these two portions of the film 28b onto which the two beam spots of the recording laser beam is shot represent marks 55 recorded on the disk 28 (see FIG. 14).

When a pair of the marks 55 are recorded on the optical magnetic disk 28 in the track direction thereof in this manner, first information which has been coded corresponding to the changing interval between thes paired marks 55 is recorded on the optical magnetic disk 28.

According to the optical recording and reproducing method and the apparatus for the same of this example, second information (different from the first one) can also be recorded on the optical magnetic disk in the track length direction thereof. Mark sets 53 each of which comprises a set of the above-mentioned paired marks 55 are formed in this case on the optical magnetic disk 28 in the track length direction thereof with predetermined intervals interposed between them (see FIG. 14). As the result, the second information which has been coded corresponding to any change in the interval between the mark sets 53 can be recorded on the optical magnetic disk 28 in the track length direction thereof.

While this mark recording is being carried out, the recording laser beam reflected by the optical magnetic disk 28 again passes through the objective 27 and the quarter-wave plate 26. Its polarizing face is converted into linear polarization which is swung from its first linear polarization by 90°, while passing through the quarter-wave plate 26. Therefore, the recording laser beam is reflected by the polarization beam splitter 25 and lead to a focus tracking servo-detector 29, which detects any change in the light quantity of the recording laser beam thus lead to it and controls the position of the objective 27 to enable optimum beam spots of the recording laser beam to be focused on the track of the optical magnetic disk 28. This prevents the marks 55 from being wrongly recorded on the optical magnetic disk 28 because of the face vibration and eccentricity of the disk 28.

According to the optical recording and reproducing method and the apparatus for the same in this example, the paired marks 55 are formed side by side on the optical magnetic disk 28 in the track width direction thereof and a set of the paired marks 55 forms the mark set 53, as described above. When polarizing timing by the acoustic optic deflector 24 is appropriately set, therefore, multi-value or first information coded corresponding to the changing interval between the marks 55 can be recorded on the optical magnetic disk 28 in the track width direction thereof. At the same time, multi-value or second information coded corresponding to the changing interval between the mark sets can be recorded on the optical magnetic disk 28 in the track length direction thereof when the mark sets are formed on the optical magnetic disk 28 in the track length direction thereof with predetermined intervals interposed between them.

Figure 15:
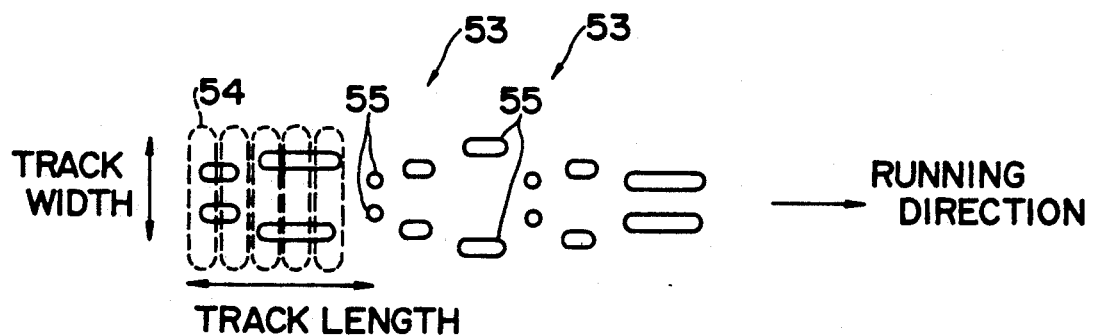
FIG. 15 schematically shows the reproducing laser beam focused on the paired marks formed on another optical magnetic disk which is employed by the optical recording and reproducing method and the apparatus for the same according to the present invention.

FIG. 15 shows another example of the optical magnetic disk 28 on which first and second informations are recorded. In this case, image data (or first information) of 4 bits (or 16 steps) which corresponds to the changing interval between the marks 55 is recorded on the optical magnetic disk 28 in the track width direction thereof and voice data (or second information) EFM-modulated is recorded thereon in the track length direction thereof.

Both of the first and the second information (different from the first one) are recorded on the track of the optical magnetic disk 28 at the same time, as described above. The recording density of the optical magnetic disk 28 can be thus increased.

Figure 13:
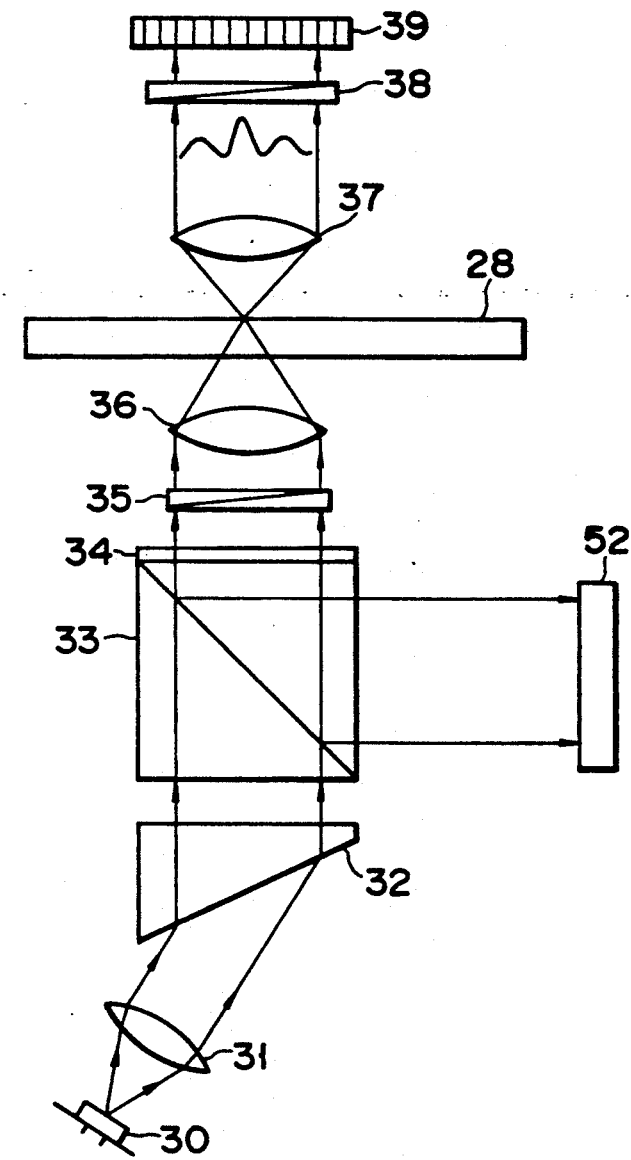
FIG. 13 schematically shows the whole of a reproducing optical system employed by the optical recording and reproducing method and the apparatus for the same according to the second embodiment of the present invention.

FIG. 13 schematically shows the arrangement of a reproducing optical system of the transmission type employed by the optical recording and reproducing method and the apparatus for the same according to the second embodiment of the present invention.

As shown in FIG. 13, reproducing laser beam shot from a laser diode 30 is converted to a parallel flux while passing through a collimator lens 31, and it is shot onto a anamorphic prism 32, which shapes its beam spot focused on the track of the optical magnetic disk 28 to have an oval section of 5 $\mu m \times 1$ $\mu m$. The reproducing laser beam which has passed through this anamorphic prism 32 is shot onto a polarizer 35 through a polarization beam splitter 33 and a quarter-wave plate 34. The reproducing laser beam which has been converted to linear polarization by the polarizer 35 is focused on the track of the optical magnetic disk 28 through an objective 36. The reproducing laser beam thus focused has an elliptic section long in the track width direction of the disk 28 but short in the track length direction thereof.

FIG. 14 shows an illuminating or shooting region 54 formed when the laser beam is shot to the paired marks 55 on the track of the optical magnetic disk 28.

The marks 55 recorded on the track of the optical magnetic disk 28 stand side by side in the track width of the disk 28. If laser beam having a circular section is used as the reproducing laser beam, it is feared that the laser beam overlaps the marks 55 of that mark set 53 which is adjacent to the illuminating or shooting region of the laser beam in the track length of the disk 28 and that this overlapped portion causes noises not to accurately read the recorded information at the time of reproduction. The reproducing optical system employed by this embodiment is therefore arranged in such a way that the illuminating or shooting region 54 of the reproducing optical system is made longer than the maximum interval 2d between the marks 55 of the mark set 53 moreover shorter than the minimum interval L between the mark sets 53.

The method of reproducing certain information by shooting the reproducing laser beam onto the paired marks 55 will be described referring to FIGS. 13 through 16.

Characteristics of the optical magnetic disk of the transmission type employed by the optical recording and reproducing method and the apparatus for the same according to the second embodiment of the present invention will be described at first.

As described above, first and second informations are recorded on the vertically-magnetized film 28b of the optical magnetic disk 28. This vertically-magnetized film 28b is characteristic in rotating the polarized face of the reproducing laser beam which passes through the vertically-magnetized film 28b in a certain direction due to the magnetooptic effect (or Faraday effect). This rotation angle ($\theta_F$) is called Faraday rotation angle. More specifically, the polarized face of the reproducing laser beam is rotated right when the direction of the reproducing laser beam entering into the film 28b is same as that of the polarization of the film 28b. When it is different from the direction of the polarization of the film 28b, however, the polarized face of the beam is rotated left.

Although the optical magnetic disk of the transmission type has been used in this example, the same result can be obtained even when an optical magnetic disk of the reflection type is used. In this case, however, the polarized face of the reproducing laser beam is rotated in a certain direction due to the magnetic Kerr effect. This rotation angle ($\theta_K$) is called Kerr rotation angle.

Figure 16:
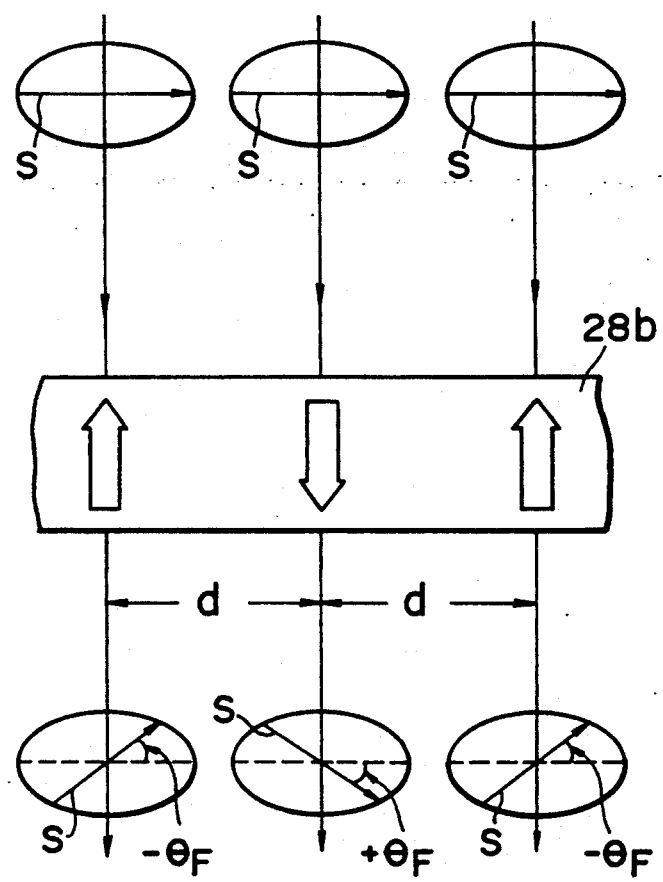
FIG. 16 schematically shows the reproducing laser beam focused at the same time on those regions of the vertically-polarized film of the optical magnetic disk where paired polarizing directions are reversed to each other, said optical magnetic disk being employed by the optical recording and reproducing method and the apparatus for the same according to the present invention.

FIG. 16 shows that the reproducing laser beam having a polarized face S perpendicular to its optical axis is shot at the same time on those areas of the vertically-magnetized film 28b where directions of paired polarizations are reversed. The polarized face S of the reproducing laser beam which has passed through that area of the film 28b where the direction of polarization is reversed to that of the beam entering into the film 28b is rotated left only by $-\theta_F$ or, more concretely, by about 1°. The polarized face S of the reproducing laser beam which has passed through that area of the film 28b where the direction of polarization is same as that of the beam entering into the film 28b is rotated right only by $+\theta_F$. Therefore, the vertically-magnetized film 28b thus formed serves as a phase grating having an interval 2d.

Namely, the vertically-magnetized film 28b becomes the phase grating in which the distribution of refractive indexes has a cycle of 2d, and the relation of the cycle 2d relative to the diffraction angle $\theta$ can be expressed as follows:

$$2d \sin \theta = \lambda$$

When the reproducing laser beam having the illuminating or shooting region 54 long in the track width direction of the optical magnetic disk 28 moreover short in the track length thereof is focused on the track of the optical magnetic disk 28 which has the above-described characteristics, therefore, the paired marks 55 in the illuminating region 54 of the beam serve as phase gratings. As the result, ± first-order diffraction beam having the relation of $2d \sin \theta = \lambda$ and zero-order diffraction beam whose polarized face is rotated only by $\theta_F$ are created from these marks 55.

As shown in FIG. 13, these diffraction beams are shot to an analyzer 38 through a focusing lens 37. This analyzer 38 is an element for detecting the state of polarization and it has the property of allowing the face of beam which is polarized in a certain direction to pass therethrough but reflecting the face of beam which is polarized in a direction perpendicular to the certain direction. When the analyzer 38 is directed in a direction perpendicular to the Faraday rotation angle $+\theta_F$ created from the not-recorded area on the optical magnetic disk 28 (see FIG. 16), therefore, the diffraction beam (having the Faraday rotation angle $+\theta_F$) and passed through that region or area of the optical magnetic disk 28 where no mark 55 is recorded can be shielded. Therefore, the diffraction beam passed through that area of the optical magnetic disk 28 where the marks 55 are recorded can be passed through a detector 39. When the interval between the maximum values of the ± first-order diffraction beam of those diffraction beams which are created by the paired marks 55 is detected by the detector 39, the first information which has been coded corresponding to the changing interval between the marks 55 can be thus reproduced.

On the other hand, the second information coded corresponding to the changing interval between the mark sets which have been recording on the track of the optical magnetic disk 28 in the track length direction thereof can be reproduced by detecting the zero-order diffraction beam.

The method of reproducing the second information will be described.

As shown in FIG. 14, the track of the optical magnetic disk 28 is scanned in the track length direction thereof by the reproducing laser beam which has the above-described illuminating or shooting region 54. The paired marks 55 are recorded at each of the regions denoted by symbols A and C in FIG. 14 on the track of the optical magnetic disk 28, but no mark 55 is recorded at the region denoted by the symbol B in FIG. 14. As described above, the polarized face of the zero-ordar diffraction beam passed through the paired-marks-recorded region on the optical magnetic disk 28 is rotated left only by $-\theta_F$. On the other hand, the polarized face of the zero-order diffraction beam passed through the paired-marks-not-recorded region is rotated right only by $+\theta_F$. And the analyzer 38 is directed in the direction perpendicular to the Faraday rotation angle ($+\theta_F$), as described above.

As the result, the zero-order diffraction beam passed through the mark-not-recorded region (denoted by the symbol B in FIG. 14) is shielded by the analyzer 38 but the ones passed through the marks-recorded regions (denoted by the symbols A and C) are shot onto the detector 39. In short, it is digital-converted into "0" and "1" whether or not the polarized component which has been rotated left only by $-\theta_F$ is present of these zero-order diffraction beams, so that the second information can be reproduced.

In a case where information is to be reproduced from the optical magnetic disk 28 on which image data is recorded in the track width direction thereof and on which voice data is recorded in the track length direction thereof, as shown in FIG. 15, the track of the optical magnetic disk 28 is scanned in the track length direction thereof by the laser beam which has the above-described illuminating or shooting region 54. As described above, zero- and ± first-order diffraction beams which have such optical interference patterns as correspond to the changing interval between the marks 55 are created by the paired marks 55. The interval between the ± first-order diffraction beams of these diffraction ones is detected by the detector 39 to thereby reproduce the image information. On the other hand, the information recorded on the track of the optical magnetic disk 28 in the track length direction thereof can be reproduced as follows: Depending upon whether or not the mark set is present at the illuminating or shooting region of the laser beam on the track of the optical magnetic disk 28, it is detected whether or not the polarized component which has been rotated left only by $-\theta_F$ is included in the zero-order diffraction beam, and when the polarized component is detected, this is EFM-demodulated to reproduce CD voice signal.

While these reproductions are being carried out, focus and track servo is conducted through the reproducing optical system of the transmission type employed by the second embodiment of the present invention. The manner of achieving this focus and track servo will be described referring to FIG. 13.

This servo-achieving manner is carried out by detecting laser beam reflected by the optical magnetic disk 28.

The reproducing laser beam reflected by the optical magnetic disk 28 is again shot to the polarization beam splitter 33 through the objective 36, the analyzer 35 and the quarter-wave plate 34. The polarized face of the laser beam reflected is converted into linear polarization which is rotated from its first linear polarization by 90°, while passing through the quarter-wave plate 34. The laser beam is thus reflected by the polarization beam splitter 33 and lead to a focus tracking servo-detector 52, which detects any change in the light quantity of the laser beam shot and controls the position of the objective 36 to enable the optimum beam spot of the laser beam to be focused on the track of the optical magnetic disk 28. This prevents the information from being wrongly reproduced because of the face vibration and eccentricity of the optical magnetic disk 28.

It should be understood that the present invention is not limited to the above-described second embodiment. It may be arranged, for example, that the recording optical system includes another analyzer directed perpendicular to the polarized face of the reproducing laser beam when this laser beam enters into the optical magnetic disk 28. When the analyzer is directed in thi manner, diffraction beams created from the paired marks 55 can be detected in exaggerated form. Further, the analyzer can be directed to meet the polarized component which is desired to detect. Even when no additional analyzer is included in the recording optical system, the interference pattern having a certain density distribution can be created. Furthermore, the information recorded on the track of the optical magnetic disk 28 in the track width direction thereof is not limited to image information but it may be others. Still further, the information recorded on the track of the optical magnetic disk 28 in the length direction thereof is not limited to CD voices but it may be image information or those whose analog FM is mark-length-converted. Still further, the above-described recording and reproducing method is not limited to the optical magnetic disk of the transmission type but it can be similarly applied to the disk of the reflection type. In the case of the optical magnetic disk of the reflection type, however, diffraction beams created due to the magnetic Kerr effect are detected to reproduce certain information.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An optical recording and reproducing method comprising:
    a first recording process of irradiating a recording laser beam onto an optical recording medium at a certain interval in the track width direction of the optical recording medium to form a mark set which comprises plural marks on the track of the optical recording medium and recording a first information which has been coded corresponding to the interval between the plural marks in the mark set on the track of the optical recording medium;
    a second recording process of irradiating the recording laser beam onto the optical recording medium in the track length direction thereof to form the plural mark sets on the track of the optical recording medium at a certain interval in the track length direction of the optical recording medium and recording a second information which has been coded corresponding to the interval between these mark sets on the optical recording medium;
    a first reproducing process of scanning the track of the optical recording medium in the track width direction thereof with a reproducing laser beam and detecting a first diffraction beam which changes corresponding to the interval between the plural marks in the mark set to reproduce the first information from the track of the optical recording medium; and
    a second reproducing process of scanning the track of the optical recording medium in the track length direction thereof with the reproducing laser beam and detecting a second diffraction beam which changes corresponding to the interval between the plural mark sets formed on the track of the recording medium in the track length direction thereof to reproduce the second information from the track of the optical recording medium.

2. The optical recording and reproducing method according to claim 1, wherein the beam length of the reproducing laser beam in the track width direction of the optical recording medium when the mark set on the optical recording medium is scanned with the reproducing laser beam is longer than the maximum interval between the plural marks in the mark set formed on the track of the optical recording medium in the track width direction thereof.

3. The optical recording and reproducing method according to claim 1, wherein the beam length of the reproducing laser beam in the track length direction of the optical recording medium when the mark set on the track of the optical recording medium is scanned with the reproducing laser beam is shorter than the minimum interval between the plural mark sets formed on the track of the optical recording medium in the track length direction thereof.

4. The optical recording and reproducing method according to claim 1, wherein the optical recording medium comprises a base plate and a recording film formed on the base plate and the recording film is a vertically-magnetized one.

5. The optical recording and reproducing method according to claim 4, wherein the first reproducing process comprises detecting any change in magnetooptic effect which is caused corresponding to the interval between the plural marks in the mark set to reproduc the first information from the track of the optical recording medium.

6. The optical recording and reproducing method according to claim 4, wherein the second reproducing process comprises detecting any change in the magnetooptic effect which is caused corresponding to the interval between the plural mark sets to reproduce the second information from the track of the optical recording medium.

7. The optical recording and reproducing method according to claim 4, wherein the first diffraction beam detected at the first reproducing process is not of the not-diffracted type but of the diffracted type.

8. The optical recording and reproducing method according to claim 4, wherein the second diffraction beam detected at the second reproducing process is of the not-diffracted type.

9. The optical recording and reproducing method according to claim 4, wherein the beam length of the reproducing laser beam in the track length direction of the optical recording medium when the mark set on the optical recording medium is scanned with the reproducing laser beam is longer than the maximum interval between the plural marks in the mark set formed on the track of the optical recording medium in the track width direction thereof.

10. The optical recording and reproducing method according to claim 4, wherein the beam length of the reproducing laser beam in the track length direction of the optical recording medium when the mark sets on the track of the optical recording medium are scanned with the reproducing laser beam is shorter than the minimum interval between the plural mark sets formed on the track of the optical recording medium in the track length direction thereof.

11. An optical recording and reproducing apparatus comprising:
   first shooting means for shooting a recording laser beam;
   a first recording means for irradiating the recording laser beam onto the track of an optical recording medium at a certain interval in the track width direction of the optical recording medium to form a mark set which comprises plural marks on the track of the optical recording medium and recording a first information which has been coded corresponding to the interval between the plural marks in the mark set on the track of the optical recording medium in the track width direction thereof;
   second recording means for irradiating the recording laser beam onto track of the optical recording medium in the track length direction thereof to form the plural mark sets on the track of the optical recording medium in the track length direction thereof at a certain interval and recording a second information which has been coded corresponding to the interval between the mark sets on the track of the optical recording medium in the track length direction thereof;
   a second shooting means for shooting a reproducing laser beam;
   a first reproducing means for scanning the track of the optical recording medium in the track width direction thereof with the reproducing laser beam and detecting a first diffraction beam which changes corresponding to the interval between the plural marks in the mark set to reproduce the first information from the track of the optical recording medium; and
   a second reproducing means for scanning the track of the optical recording medium in the track length direction thereof with the reproducing laser beam and detecting a second diffraction beam which changes corresponding to the interval between the plural mark sets formed on the track of the optical recording medium in the track length direction thereof to reproduce the second information from the track of the optical recording medium.

12. The optical recording and reproducing apparatus according to claim 11, wherein the beam length of the reproducing laser beam in the track width direction of the optical recording medium when the mark set on the track of the optical recording medium is scanned by the second shooting means is longer than the maximum interval between the plural marks in the mark set formed on the track of the optical recording medium in the track width direction thereof.

13. The optical recording and reproducing apparatus according to claim 11, wherein the beam length of the reproducing laser beam in the track length direction of the optical recording medium when the mark sets on the track of the optical recording medium are scanned by the second shooting means is shorter than the minimum interval between the plural mark sets formed on the track of the optical recording medium in the track length direction thereof.

14. The optical recording and reproducing apparatus according to claim 11, wherein the optical recording medium comprises a base plate and a recording film formed on the base plate and the recording film is a vertically-magnetized one.

15. The optical recording and reproducing apparatus according to claim 14, wherein the first reproducing means detects any change in magnetooptic effect which is caused corresponding to the interval between the plural marks in the mark set on the track of the optical recording medium to reproduce the first information from the track of the optical recording medium.

16. The optical recording and reproducing apparatus according to claim 14, wherein the second reproducing means detects any change in the magneto optic effect which is caused corresponding to the interval between the plural mark sets on the track of the optical recording medium to reproduce the second information from the track of the optical recording medium.

17. The optical recording and reproducing apparatus according to claim 14, wherein the first diffraction beam detected by the first reproducing means is not of the not-diffracted type but of the diffracted type.

18. The optical recording and reproducing apparatus according to claim 14, wherein the second diffraction beam detected by the second reproducing means is of the not-diffracted type.

* * * * *